United States Patent [19]
Gellert et al.

[11] Patent Number: 5,658,604
[45] Date of Patent: Aug. 19, 1997

[54] INJECTION MOLDING CARBIDE TORPEDO

[75] Inventors: Jobst Ulrich Gellert; Nin Ho, both of Georgetown, Canada

[73] Assignee: Mold-Masters Limited, Georgetown, Canada

[21] Appl. No.: 585,848

[22] Filed: Jan. 16, 1996

[30] Foreign Application Priority Data

Feb. 18, 1995 [CA] Canada ............... 2165514

[51] Int. Cl.⁶ ............... B29C 45/20
[52] U.S. Cl. ............... 425/549; 264/328.15
[58] Field of Search ............... 425/549; 264/328.15

[56] References Cited

U.S. PATENT DOCUMENTS 5,299,928  4/1994  Gellert ............... 425/549

OTHER PUBLICATIONS

Mold–Masters Limited—Sep. 1995—"Dura Hot Runner Systems".

*Primary Examiner*—Tim Heitbrink
*Attorney, Agent, or Firm*—Dalesman & Company

[57] ABSTRACT

An injection molding torpedo which can itself be injection molded by a M/M process of a carbide alloy to have high resistance to corrosion and wear. The torpedo has a conical front surface which forms a pointed tip and a melt channel extending to an outlet on the conical front surface. The melt channel has a central rear portion extending from an inlet on the surface of the torpedo and a diagonal front portion extending from the rear portion to the outlet. The diagonal front portion of the melt channel is tapered inwardly enough to offset the diagonal at which it extends to allow for free ejection of the molded torpedo from its mold. This requires that the taper be enough that the shortest longitudinal line along the inner surface forming the melt channel does not diverge outwardly anywhere along its length.

4 Claims, 2 Drawing Sheets

INJECTION MOLDING CARBIDE TORPEDO

BACKGROUND OF THE INVENTION

This invention relates generally to injection molding and more particularly to a hot tip torpedo molded of a carbide alloy to be seated in the front end of a heated nozzle in alignment with a gate.

As seen in Mold-Masters Limited brochure entitled "DURA Hot Runner Systems" dated September 1995, hot tip torpedoes having a melt channel with a diagonal front portion extending to an outlet on a conical front surface are already known. However, the melt channel of these previous torpedoes is not tapered and they are made of copper alloy plated or other very conductive materials by conventional machining. While they are satisfactory for some applications, they have the disadvantages that these materials are sufficiently resistant to corrosion and wear from the pressurized melt flowing therethrough.

It is also known that carbide alloys are more resistant to corrosion and wear than these other materials. However, carbide alloys are very difficult to machine, and it would be prohibitively expensive to machine these previous torpedoes of a carbide alloy. Using a M/M (metal injection molding) process to make metal products by injection molding the powdered metal in a molten liquid form and then debinding and sintering the product is also known. However, making these previous torpedoes by injection molding is impossible because their shape would prevent ejection from the mold.

SUMMARY OF THE INVENTION

Accordingly, it is an object of the present invention to at least partially overcome the disadvantages of the prior art by providing an injection molding torpedo having a shape which can be injection molded of a carbide alloy.

To this end, in one of its aspects, the invention provides an injection molding torpedo having a rear surface, a longitudinally extending central axis, a conical front surface extending to a pointed tip, and an inner surface forming a melt channel extending through the torpedo from an inlet on the rear surface to an outlet on the conical front surface, the melt channel having a central rear portion and a diagonal front portion, the central rear portion of the melt channel extending forwardly from the inlet on the rear surface, the diagonal front portion of the melt channel extending diagonally outwardly to connect the rear portion of the melt channel to the outlet on the conical front surface, the inner surface of the torpedo forming the melt channel having a shortest longitudinal line extending longitudinally between the inlet on the rear surface and the outlet on the conical front surface, said shortest longitudinal line reaching the outlet furthest away from the central axis, having the improvement wherein the diagonal front portion of the melt channel extending towards the outlet on the conical front surface has an inward taper sufficient to ensure said shortest longitudinal line extending along the inner surface of the torpedo forming the melt channel between the inlet and the outlet does not diverge outwardly with respect to said central axis anywhere along the melt channel as the melt channel extends from the inlet on the rear surface to the outlet on the conical front surface.

Further objects and advantages of the invention will appear from the following description taken together with the accompanying drawings.

DETAILED DESCRIPTION OF THE INVENTION

Figure 1:
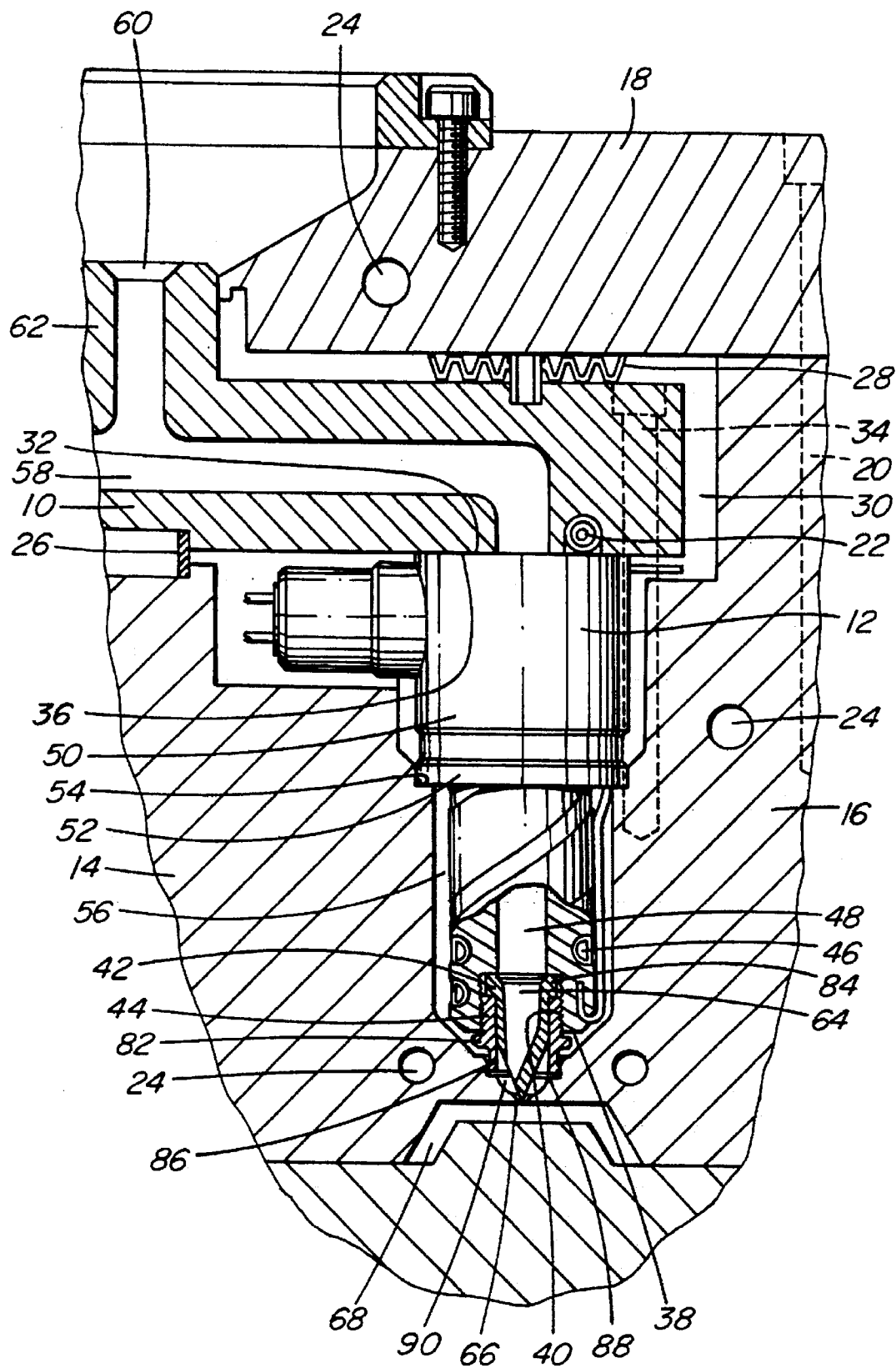
FIG. 1 is a sectional view of a portion of a multi-gate injection molding system showing a torpedo according to a preferred embodiment of the invention.

Reference is first made to FIG. 1 which shows a portion of a multi-cavity injection molding system or apparatus having a melt distribution manifold 10 interconnecting several heated nozzles 12 in a mold 14. While the mold 14 usually has a greater number of plates depending upon the application, in this case only a cavity plate 16 and a back plate 18 which are secured together by screws 20 are shown for ease of illustration. In the configuration shown, the melt distribution manifold 10 is heated by an integral electrical heating element 22 and the mold 14 is cooled by pumping cooling water through cooling conduits 24. The melt distribution manifold 10 is mounted between the cavity plate 16 and the back plate 18 by a central locating ring 26 and a number of insulative and resilient spacers 28 which provide an insulative air space 30 between the heated manifold 10 and the surrounding cooled mold 14.

The rear end 32 of each nozzle 12 is secured by screws 34 against the front face 36 of the melt distribution manifold 10. The front end 38 of each nozzle 12 has a threaded seat 40 in which a torpedo 42 according to the invention is secured by a threaded nozzle seal 44. Each nozzle 12 has an integral electrical heating element 46 extending around a central melt bore 48. An outer collar 50 at the rear end 32 of each nozzle 12 has a forwardly extending flange portion 52 which sits on a circular seat 54 in the mold 14 to locate the nozzle 12 and provide an insulative air space 56 between the heated nozzle 12 and the surrounding cooled mold 14.

A melt passage 58 extends from a central inlet 60 in a cylindrical inlet portion 62 of the melt distribution manifold 10 and branches outwardly in the manifold 10 to convey melt through the central melt bore 48 in each of the heated nozzles 12. The melt then flows through an aligned melt channel 64 in the torpedo 42 to a gate 66 extending through the cavity plate 16 to a cavity 68 as explained in more detail below.

Figure 2:
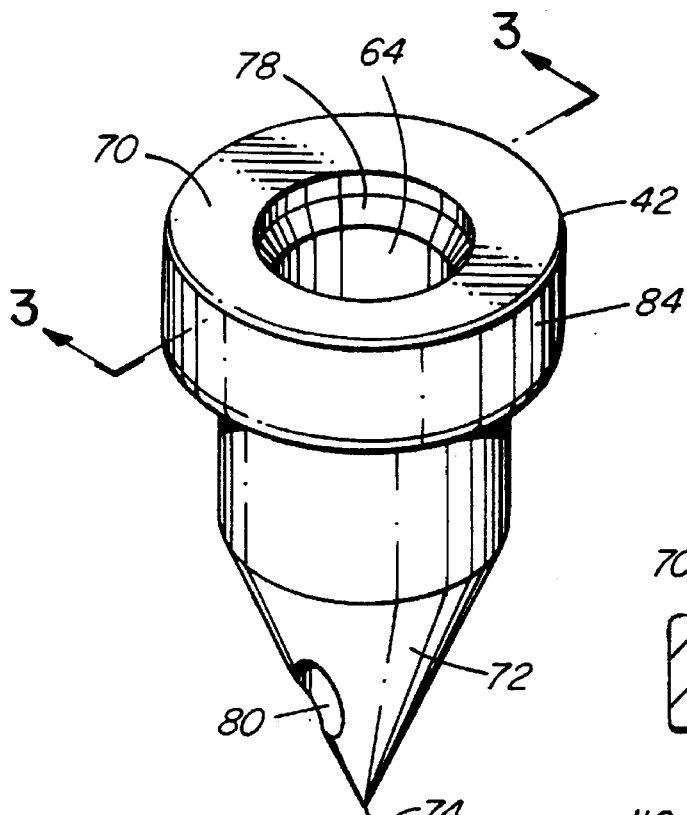
FIG. 2 is an isometric view of the same torpedo.
Figure 3:
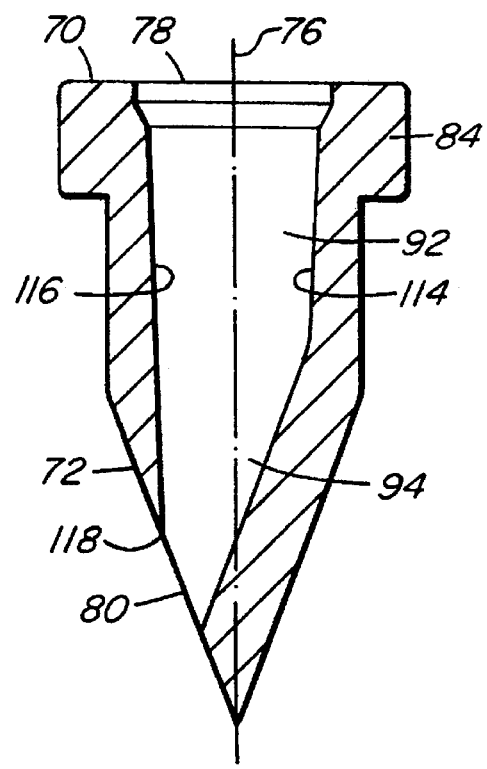
FIG. 3 is a sectional view along line 3—3 in FIG. 2.

Referring also to FIGS. 2 and 3, the torpedo 42 has a flat rear surface 70 and a conical front surface 72 which extends to a pointed tip 74 on its central longitudinal axis 76. The melt channel 64 extends through the torpedo 42 from an inlet 78 on the rear surface 70 to an outlet 80 on the conical front surface 72. As seen in FIG. 1, the threaded nozzle seal 44 has an outwardly extending hexagonal portion 82 which allows it to be tightened against an outer rear flange portion 84 to secure the torpedo 42 in place. The front end 86 of the nozzle seal 44 fits into a circular seat 88 extending in the cavity plate 16 around the gate 66 to accurately locate the pointed tip 74 in alignment with the gate 66. In this position, the melt flows out of the outlet 80 of the melt channel 64 in the torpedo into a circular space 90 in the mold 14 around the conical front surface 72 and then through the gate 66 around the pointed tip 74 and into the cavity 68. The nozzle seal 44 extends around this circular space 90 and prevents leakage of the pressurized melt into the adjacent insulative air space 56.

As best seen in FIG. 3, the melt channel 64 through the torpedo 42 has a central rear portion 92 and a diagonal front portion 94. The central rear portion 92 extends forwardly from the inlet 78 on the rear surface 70 in alignment with the central longitudinal axis 76 of the torpedo 42. The diagonal front portion 94 extends diagonally outwardly to connect the central rear portion 92 to the outlet 80 on the conical front surface 72. The diagonal angle with respect to the central longitudinal axis 76 at which the diagonal front portion 94 extends can be more or less but usually is about 15°.

Figure 4:
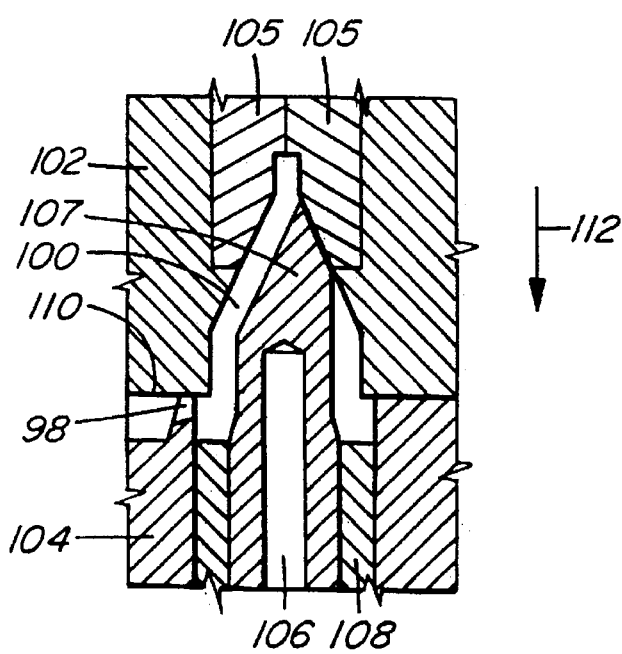
FIG. 4 is a sectional view of one portion of multi-cavity injection molding apparatus used to mold the torpedo seen in FIGS. 1–3.

Reference will now also be made to FIG. 4 to describe how the shape of the torpedo seen in FIG. 3 allows it to be injection molded in apparatus as seen in FIG. 4. In this embodiment, the torpedo is molded of a tungsten cobalt carbide alloy, but in other embodiments it can be made of other carbide alloys having suitable corrosion and wear resistant characteristics. As shown in FIG. 4, the torpedo is made by injecting the molten carbide alloy through a gate 98 into a cavity 100 formed between a cavity plate 102 and the ejector side 104 of the mold. Venting inserts 105 are received in the cavity plate 102 and a cooling tube 106 extends in a core 107 with an ejector sleeve 108 positioned to eject the molded torpedo from the mold. It will be appreciated that only a very small portion of the multi-cavity injection molding apparatus is shown sufficient to relate the shape of the torpedo 42 seen in FIG. 3 to the method of making it. After the cavities 100 have been filled and a suitable packing and cooling period has expired, the mold is opened for ejection along the parting line 110 in the direction of draw indicated by arrow 112. After ejection, the torpedo 44 is debinded to remove the polymer and sintered which causes shrinkage of between 16–20%. It is then finished to form the final product by grinding with diamond grinding wheels.

Both the central rear portion 92 and the diagonal front portion 94 of the melt channel 64 formed by the inner surface 112 of the torpedo 42 are tapered inwardly towards the front. As seen in FIG. 3, the front portion 94 extending at a diagonal angle results in the inner surface 114 having a shortest longitudinal line 116 extending between the inlet 78 and the outlet 80. This shortest line 116 reaches the outlet 80 at a point 118 on the outlet 80 furthest from the central longitudinal axis 76. In this embodiment, the central rear portion 92 of the melt channel 64 has a slight inward taper of 4° to facilitate ejection by the ejector sleeve 108. However, the diagonal front portion 94 of the melt channel 64 must be tapered inwardly enough to at least offset the diagonal angle at which the front portion 94 of the melt channel 64 extends to allow for ejection of the torpedo 42 in the direction of draw 112 shown in FIG. 4. In other words, the diagonal front portion 94 must have sufficient inward taper to ensure that the shortest longitudinal line 116 along the inner surface 114 of the torpedo 42 does not diverge outwardly with respect to the central longitudinal axis anywhere along the melt channel 64 as it extends from the inlet 78 on the rear surface 70 to the outlet 80 on the conical front surface 72. In this particular embodiment, the diagonal front portion 94 of the melt channel 64 is tapered inwardly sufficiently that the shortest longitudinal line 116 along the inner surface 114 of the torpedo 42 is straight between the inlet 78 and the outlet 80. Thus, as seen in FIG. 4, the torpedo 42 having this shape does not interfere with ejection in the direction of draw 112 which would otherwise be the case if the diagonal front portion 94 of the melt channel 64 were not tapered.

In use, after assembly and installation in a mold 14, as shown in FIG. 1, electrical power is applied to the heating element 22 in the manifold 10 and to the heating elements 46 in the nozzles 12 to heat them to a predetermined operating temperature. Pressured melt is applied from a molding machine (not shown) to the central inlet 60 of the melt passage 32 according to a predetermined cycle. The melt flows through the melt passage 58 in the melt distribution manifold 10 to the aligned central melt bore 48 in each nozzle 12 and through the then aligned melt channel 64 in the respective torpedo 42. The melt from the melt channel 64 then flows into the circular space 90 in the mold 14 around the conical front surface 72 and then through the gate 66 into the cavity 68. The nozzle seal 44 prevents leakage of the melt from the circular space 90 as well as locates the pointed tip 74 of the torpedo 42 in exact alignment with the gate 66. After the cavities 68 are filled and a suitable packing and cooling period has expired, the injection pressure is released and the melt conveying system is decompressed to avoid stringing through the open gates 66. The mold 14 is then opened to eject the molded products. After ejection, the mold 14 is closed and the cycle is repeated continuously with a cycle time dependent upon the size of the cavities 68 and the type of material being molded.

While the description of the injection molding torpedo 42 has been given with respect to a preferred embodiment, it will be evident that various other modifications are possible without departing from the scope of the invention as understood by those skilled in the art and as defined in the following claims.

The embodiments of the invention in which an exclusive property or privilege is claimed is defined as follows:

1. In an injection molding apparatus having at least one heated nozzle with a front end seated in a mold, a melt bore extending through the at least one heated nozzle to convey melt to a gate leading to a cavity, and a torpedo seated in the front end of the at least one nozzle and secured in place by a nozzle seal, the torpedo having a rear surface, a longitudinally extending central axis, a conical front surface extending to a pointed tip, and an inner surface forming a melt channel extending through the torpedo from an inlet on the rear surface aligned with the melt bore of the at least one heated nozzle to an outlet on the conical front surface near the gate, the melt channel through the torpedo having a central rear portion and a diagonal front portion, the central rear portion of the melt channel extending forwardly from the inlet on the rear surface, the diagonal front portion of the melt channel extending diagonally towards the outlet to connect the central rear portion of the melt channel to the outlet on the conical front surface, the inner surface of the torpedo forming the melt channel having a longitudinal line extending between the inlet on the rear surface and the outlet on the conical front surface, said longitudinal line reaching the outlet to at a point further away from the central axis than any other point on said outlet the improvement wherein;

the torpedo is molded of a carbide alloy with the diagonal front portion of the melt channel extending towards the outlet on the conical front surface and having an inward taper sufficient to ensure said longitudinal line extending along the inner surface of the torpedo forming the melt channel between the inlet and the outlet does not diverge outwardly with respect to said central axis anywhere along the melt channel as the melt channel extends from the inlet on the rear surface to the outlet on the conical front surface.

2. An injection molding apparatus as claimed in claim 1 wherein the central rear portion of the melt channel tapers slightly inwardly away from the inlet on the rear surface.

3. An injection molding apparatus as claimed in claim 2 wherein both the central rear portion and the diagonal front portion of the melt channel have a circular cross-section.

4. An injection molding apparatus as claimed in claim 3 wherein said shortest longitudinal line extending along the inner surface of the torpedo forming the melt channel is substantially straight.

\* \* \* \* \*